US012530363B1

(12) United States Patent
Bernt et al.

(10) Patent No.: US 12,530,363 B1
(45) Date of Patent: Jan. 20, 2026

(54) INTEGRATING DATA LAKE SEGMENTS WITH CUSTOMER RELATIONSHIP MANAGEMENT SYSTEM

(71) Applicant: Salesforce, Inc., San Francisco, CA (US)

(72) Inventors: Christopher Bernt, San Francisco, CA (US); Arthur Kong, San Francisco, CA (US); Arie Kusnadi, Bellevue, WA (US); Daniel Crawford, Remote, CA (US); Christopher Gamble, Bellevue, WA (US); Darrel Liu, Bellevue, WA (US); Karthik Balaji Mahadevarao Premnath, San Francisco, CA (US); Siddharth Patel Aka Khunt, San Francisco, CA (US); Lingyi Wang, Bellevue, WA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/987,887

(22) Filed: Dec. 19, 2024

(51) Int. Cl.
*G06F 16/248* (2019.01)
(52) U.S. Cl.
CPC ................. *G06F 16/248* (2019.01)
(58) Field of Classification Search
CPC ............... G06F 16/248; G06F 16/2457; G06F 16/9003; G06Q 10/10; G06Q 30/02
See application file for complete search history.

(56) References Cited

U.S. PATENT DOCUMENTS

| | | | |
|---|---|---|---|
| 9,740,675 B1* | 8/2017 | Machalek | G06Q 10/10 |
| 10,970,298 B1* | 4/2021 | Madheswaran | H04L 41/22 |
| 11,093,518 B1* | 8/2021 | Lu | G06F 11/3476 |
| 11,113,334 B2* | 9/2021 | Wilson | G06F 16/3322 |
| 11,461,786 B2* | 10/2022 | Knapp | G06F 3/0488 |
| 11,768,812 B2* | 9/2023 | Nair | G06F 3/04842 715/810 |
| 2008/0270398 A1* | 10/2008 | Landau | G06Q 30/0601 705/26.1 |
| 2011/0093441 A1* | 4/2011 | Jackson | G06Q 30/02 707/689 |

(Continued)

OTHER PUBLICATIONS

Weinmeister, "Practical Salesforce Development Without Code", 2019, Apress, Second Edition, pp. 1-507 (Year: 2019).*

*Primary Examiner* — Jorge A Casanova
(74) *Attorney, Agent, or Firm* — Weaver Austin Villeneuve & Sampson LLP

(57) ABSTRACT

Methods and corresponding systems and apparatuses for integrating data from disparate data sources are described. A list of accounts that are accessible to a user of a customer relationship management (CRM) database may be determined. At least one segment may be determined. The at least one segment may represent a group of individuals that satisfy membership criteria associated with the at least one segment. One or more individuals that are (i) associated with a given account in the list of accounts and (ii) included in the at least one segment may be determined based at least in part on one or more queries involving data tables that reside in a data cloud platform separate from the CRM database. Information describing at least the one or more individuals may be provided for presentation in a graphical user interface (GUI).

20 Claims, 10 Drawing Sheets

(56) References Cited

U.S. PATENT DOCUMENTS

| | | | |
|---|---|---|---|
| 2011/0302028 A1* | 12/2011 | Swenson | G06Q 30/0251 |
| | | | 705/14.49 |
| 2015/0227861 A1* | 8/2015 | Everton | G06F 16/958 |
| | | | 705/342 |
| 2016/0078455 A1* | 3/2016 | O'Donnell | G06F 16/951 |
| | | | 705/7.29 |
| 2016/0350774 A1* | 12/2016 | Brooks | G06Q 30/0204 |
| 2018/0365309 A1* | 12/2018 | Oliner | G06F 9/542 |
| 2021/0150489 A1* | 5/2021 | Haramati | G06F 16/252 |
| 2021/0157978 A1* | 5/2021 | Haramati | G06F 40/177 |
| 2025/0157642 A1* | 5/2025 | Lequeux | G16H 15/00 |

\* cited by examiner

INTEGRATING DATA LAKE SEGMENTS WITH CUSTOMER RELATIONSHIP MANAGEMENT SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to approaches and interfaces for data lake integration with customer relationship management (CRM) data.

BACKGROUND

Customer relationship management (CRM) systems typically work by consolidating customer data into a centralized digital platform. Customer data may include, for example, identifying information such as names, email addresses, phone numbers, mailing addresses, and social media handles, which may be collected during initial interactions or purchases.

BRIEF DESCRIPTION OF THE DRAWINGS

The included drawings are for illustrative purposes and serve only to provide examples of possible structures and process steps for the disclosed techniques. These drawings in no way limit any changes in form and detail that may be made to implementations by one skilled in the art without departing from the spirit and scope of the disclosure.

DETAILED DESCRIPTION

Figure 1:
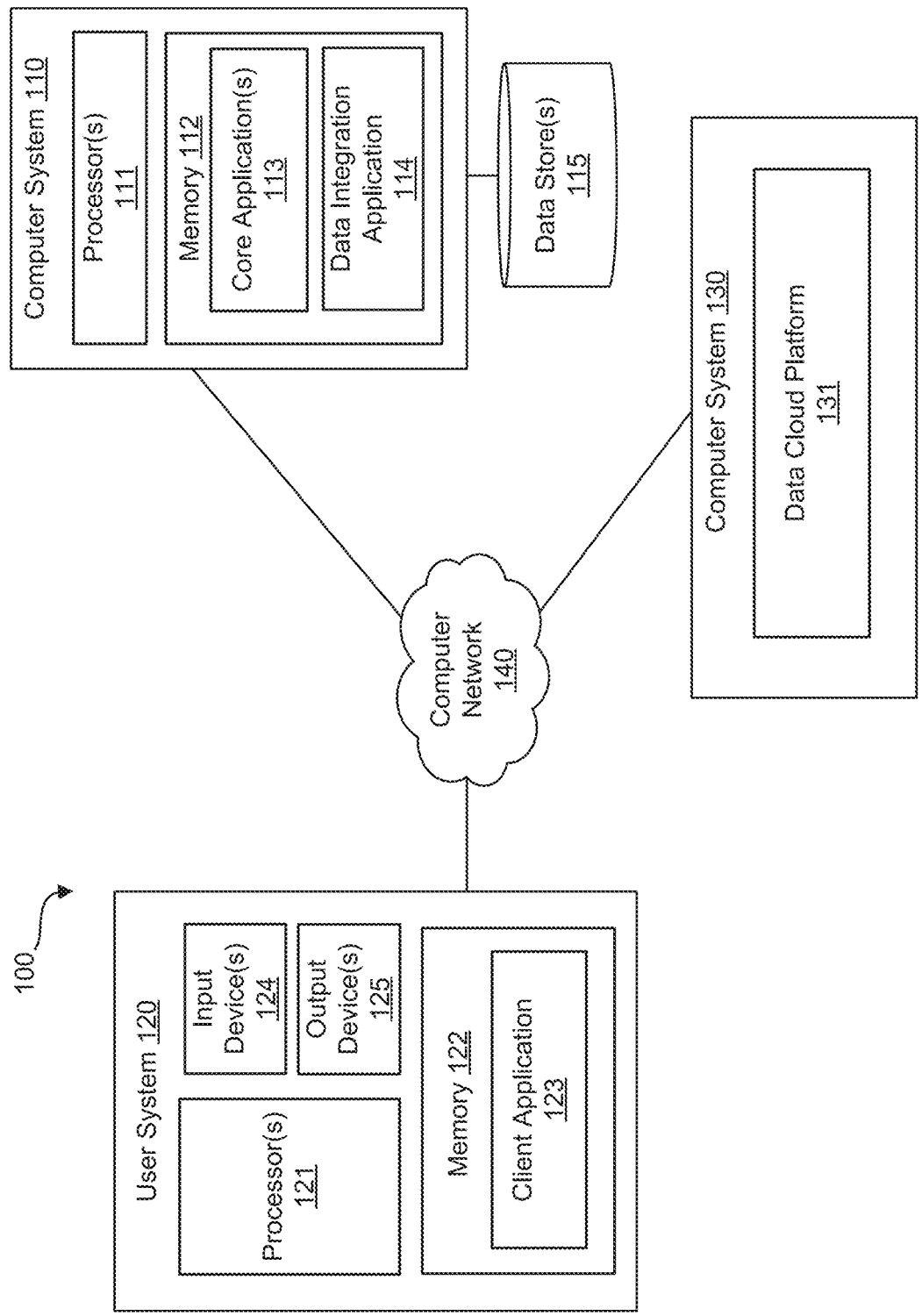
FIG. 1 shows a block diagram of an example computing environment, according to some embodiments.

Examples of systems and methods for integrating data lake data within Customer Resource Management (CRM) systems and providing related graphical user interfaces (GUIs) are described herein with reference to certain implementations. These examples are being provided solely to add context and aid in the understanding of the present disclosure. It will thus be apparent to one skilled in the art that the techniques described herein may be practiced without some or all of these specific details. In other instances, well-known process operations have not been described in detail in order to avoid unnecessarily obscuring the present disclosure. Other applications are possible, such that the following examples should not be taken as definitive or limiting either in scope or setting.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more examples may be implemented in numerous ways, including as a process, an apparatus, a system, a device, a method, a computer-readable medium such as a non-transitory computer-readable storage medium containing computer-readable instructions or computer program code, or as a computer program product comprising a computer usable medium having a computer-readable program code embodied therein.

Enterprise organizations often rely on data that is stored in a distributed fashion. For example, information about customers or potential leads may be stored in a CRM operated by a service provider. Separate from the CRM database, the service provider may also access a data cloud platform for storing various types of organizational data (e.g., structured data, semi-structured data, unstructured data, etc.), which can come from any number of external sources accessible to an organization. In some configurations, the data cloud platform may implement a data lake architecture and store the various types of data as objects, such as data lake objects (DLOs) and data model objects (DMOs).

To gather better insights and focus resources, organizations may need to be able to merge and analyze data from both the CRM and the data cloud platform. For example, some data objects in the data cloud platform may be grouped into segments. Each segment may be associated with its own membership criteria, thereby enabling automatic enrollment of data objects, such as data objects corresponding to individuals (or entities) (e.g., Individual DMOs) into various segments. As an example, data objects may be grouped into marketing segments. The CRM may include additional records for companies and individuals represented as objects in the data cloud platform.

It may be beneficial to combine related data from such different data stores. For example, in various embodiments, it may be advantageous to provide users (e.g., sellers, employees of an enterprise organization, etc.) with one or more graphical user interfaces that provide a comprehensive yet customized view of the merged and analyzed data from such different datastores. As an example, a view that may be generated and provided may include a list of companies (e.g., account name), corresponding segments associated with each company (e.g., Biotech, FoodTech, etc.), corresponding contacts (or prospects) (e.g., individual names, titles, contact information, etc.) associated with each company, among other information.

This may be challenging for several reasons. First, the data stores are not necessarily synchronized. For example, segments may be updated hourly, so the latest segments should be obtained before combining with CRM data. Second, there may be technical constraints on how the data stores can be accessed and/or how data can be presented to the user. For example, SQL queries to the data cloud platform may be limited to a maximum number of parameters per query. If the data are to be displayed in a certain order (e.g., alphabetically by company name) and exceed the query size limit, running a single query and sorting the results can lead to incorrect data being presented. Another technical constraint is the user interface through which the data is presented. The data is generally arranged in table format. The UI may be configured to display a limited number of results at a time (e.g., 50 rows per screen page). If the next set of results has not already been obtained and sorted (e.g., pre-loaded into system memory) by the time the user scrolls the page, this may necessitate additional queries to the data stores. New queries may also be needed when the user reconfigures the UI (e.g., to sort by a different field or to change filter criteria).

Embodiments described herein provide a claimed solution that is necessarily rooted in computer technology (e.g., computer networks). The claimed solution involves performing a series of queries to disparate data stores, then merging and sorting the query results in post-processing to generate the data for display.

According to some embodiments, CRM data and cloud data are linked by an account identifier (e.g., account ID). For example, an account record in the CRM database may be stored in association with the same account ID as an Account DMO, and an Individual DMO may be stored in association with the account ID of a company where the individual works. In various embodiments, the CRM database may be queried to identify all account IDs that are accessible (or visible) to a user (e.g., seller, employee, etc.), as defined by one or more policies that govern user access to CRM data. This first query may be exhaustive to ensure correct sort order, so the result of this query could potentially exceed the maximum query length of the data cloud platform. In that case, the query to the data cloud platform could be broken up into multiple queries.

According to some embodiments, after the first query has been executed, locations of relevant tables (e.g., segment membership tables, unified individual tables) in the data cloud platform may be determined based on metadata maintained by the service provider on the CRM side. As an example, the CRM database may store metadata identifying the latest segment membership table and unified individual table. A segment membership table may be a DMO that may be generated or updated each time the segmentation process is run (e.g., hourly, daily, etc.). The segment membership table may identify data objects that belong to a given segment. For example, the segment membership table may provide a list individuals associated with the segment.

In some embodiments, based on the table information obtained from the CRM database, a query may be constructed for obtaining cloud data (e.g., fields from matching Account DMOs and Individual DMOs) for any accounts that are: (i) identified as being accessible to the user and (ii) associated with an individual who is a member of a requested (or selected) segment. The results may then be merged with corresponding CRM data (e.g., account records from the CRM database) and provided for presentation in one or more graphical user interfaces.

FIG. 1 shows a block diagram of an example computing environment 100 incorporating one or more implementations. The computing environment 100 includes a computer system 110, a user system 120, and a computer system 130, which may communicate through one or more computer networks 140 (e.g., the Internet). The computer network(s) 140 may include one or more wireless networks, one or more wireline networks, or a combination of wired and wireless networks. For example, the computer network 140 may be any one or any combination of one or more LANs (local area networks), WANs (wide area networks), telephone networks, and wireless networks, among others.

The user system 120 may include a client application 123 configured to interact with the computer system 110. The client application 123 may be a web browser or thin-client program configured to communicate with the computing system 110, for example, through one or more application programming interfaces (APIs). As an example, a web API may enable exchange of Hypertext Transfer Protocol (HTTP) requests and responses between the client application 123 and applications running on the computer system 110, such as one or more core applications 113 and/or a data integration application 114. Alternatively, in some implementations, the core application(s) 113 and/or the data integration application 114 may be installed and executed on the user system 120 as a standalone program. The user system 120 may include one or more processors 121 and memory 122. The processor(s) 121 may include general-purpose processors, special-purpose processors, or combinations thereof. The memory 122 may include one or more memory devices comprising non-volatile storage, volatile storage, or a combination thereof. Further, the user system 120 may include one or more input devices 124 (e.g., keyboard, touchscreen, etc.) and one or more output devices 125 (e.g., display screen(s), headset, etc.).

The computer system 110 may provide various cloud-based services, such as one or more core applications 113 and/or the data integration application 114. The computer system 110 may include one or more processors 111 and memory 112. The processor(s) 111 may include general-purpose processors, special-purpose processors, or combinations thereof. The memory 112 may include one or more memory devices comprising non-volatile storage, volatile storage, or a combination thereof. The computer system 110 may be configured to provide access to one or more core applications 113 and/or the data integration application 114, for example, upon execution by the processor(s) 111. In various embodiments, the computer system 110 may implement a Software as a Service (Saas) model, a Platform as a Service (PaaS) model, or any other cloud computing model, to facilitate access to the core application(s) 113 and/or the data integration application 114.

The core application(s) 113 may be provided to users associated with one or more tenants (e.g., enterprise organizations) of the computer system 110 and may provide functionality relating to sales, customer support, customer relationship management (CRM), marketing, finance, messaging, electronic commerce, data analytics, for example. Thus, the core application(s) 113 may form a software suite available to users of the computer system 110, for example, on a subscription basis. In some implementations, servers in different data centers may provide the core application(s) 113.

In various embodiments, the data integration application 114 may be configured to integrate data from various data sources (e.g., data lake objects, data model objects, etc.), as managed by the computer system 130, with data (e.g., CRM data) managed by the computer system 110, as described herein. When executed, the data integration application 114 may cause the user system 120 to present one or more graphical user interfaces through one or more of the output devices 125. The graphical user interface(s) may provide various information and functionality, as described herein.

The computer system 110 may be associated with one or more data stores 115, which may be accessible through wired or network-based connections. The data store(s) 115 may include tenant-specific data that can only be accessed by users associated with the same tenant. In a multi-tenant environment, the computer system 110 may isolate the data store(s) such that users associated with one tenant have no access or visibility into local data belonging to a different tenant. Further, within a single tenant, access permissions may be configured on a user-by-user basis, such that permission levels may vary among users, for example, based on position, title, role, etc. The data store(s) 115 may store various tenant-specific data, such as data relating to sales, customer support, customer relationship management (CRM), marketing, finance, messaging, electronic commerce, data analytics, and/or the like.

The computer system 130 may include one or more processors and memory which implement a data cloud platform 131. The data cloud platform 131 may be accessible using one or more application programming interfaces (APIs), which facilitate the storage and management of data obtained from various data sources. For example, the data cloud platform 131 may implement a data lake architecture in which an extensive variety of user data from multiple sources, encompassing all forms of data types and structures, may be stored and managed. The data cloud platform 131 may store such data as structured data (e.g., financial transactions and billing information, customer relationship management records, etc.), semi-structured data (e.g., JSON files, XML files, web content, clickstream data, email communications, etc.), or unstructured data (e.g., social media posts and reactions, images and videos, text documents, customer reviews and feedback, etc.).

Figure 2:
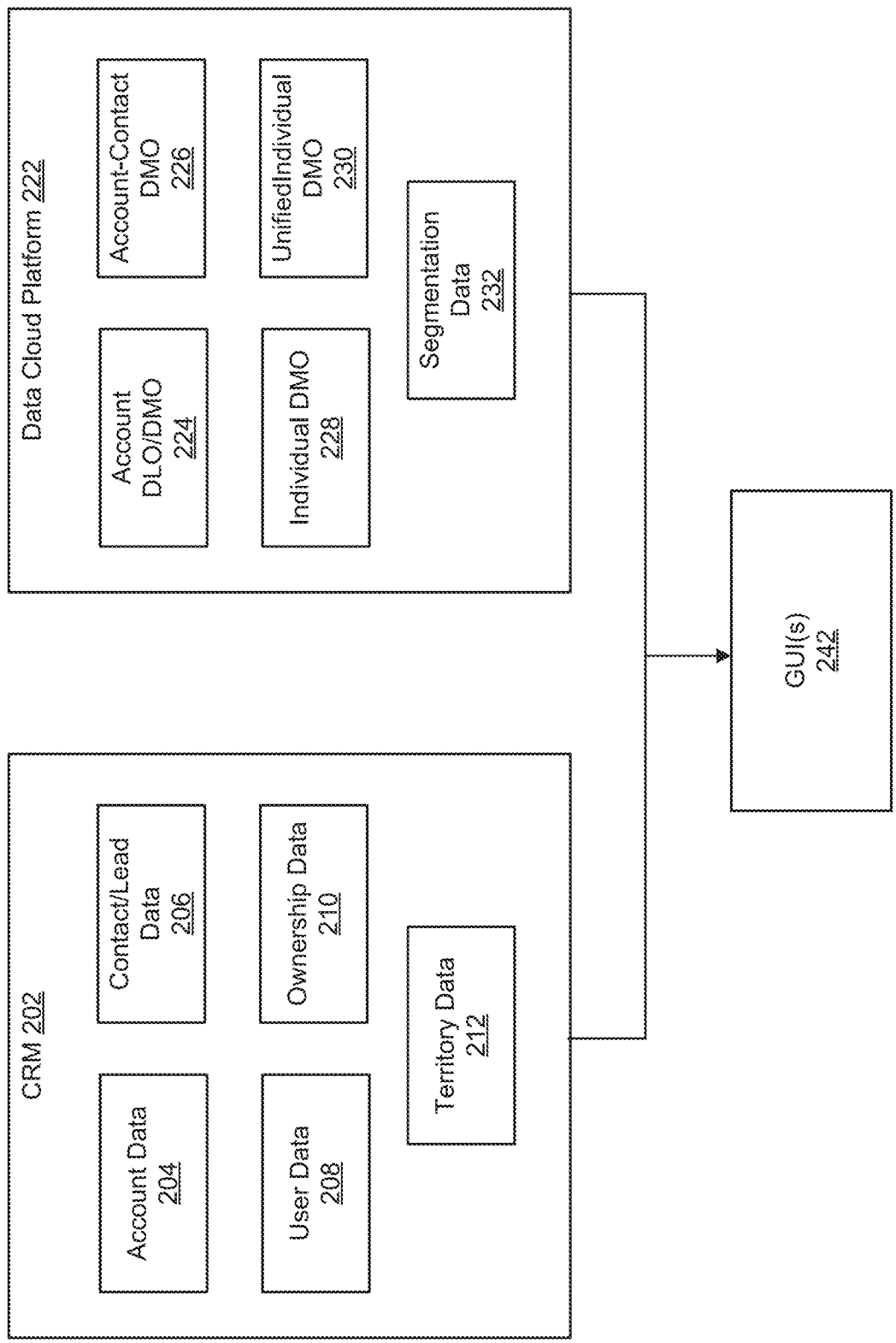
FIG. 2 illustrates example types of data that may be stored and managed by a CRM and a data cloud platform, according to some embodiments.

FIG. 2 illustrates example types of data that may be stored and managed by a CRM database and a data cloud platform, according to some embodiments. For example, FIG. 2 shows a CRM 202 and a data cloud platform 222. In this example, the CRM 202 may be implemented as the computer system 110 of FIG. 1, and the data cloud platform 222 may be implemented as the computer system 130.

According to some embodiments, the CRM 202 may store and manage various types of CRM data, such as account data 204, contact/lead data 206, user data 208, ownership data 210, and territory data 212.

The account data 204 may include data corresponding to accounts (e.g., organizations, companies, etc.) of a given entity (e.g., business). For a given account, the account data 204 may include corresponding details, such as account ID, account name, address, phone numbers, industry classification, and website, to name some examples. Accounts may be categorized into types like customers, prospects, or partners.

The contact/lead data 206 may include data corresponding to contacts and leads, which may be individuals associated with an account. For a given contact, the contact/lead data 206 may include a corresponding profile with details, such as name, title and/or role within an organization, contact details (e.g., email, address, phone, etc.), among other information. In general, contacts may be linked to accounts and may be current or potential customers. In contrast, leads may represent unqualified prospects who have shown interest in a product or service but have yet to be confirmed as potential buyers. For a given lead, the contact/lead data 206 may include corresponding details, such as name, title, email address, and phone number.

The user data 208 may include data corresponding to users of the CRM 202, which may be associated with accounts. For example, users may be individuals involved in customer interactions. For a given user, the user data 208 may include a corresponding profile with details, such as name, title and/or role within an organization, contact details (e.g., email, address, phone, etc.), access permissions, and task assignments, among other information.

The ownership data 210 may include data identifying users who are responsible for managing specific accounts or contacts within the CRM 202. For example, the ownership data 210 may identify a user assigned to an account or contact as the owner. The ownership data 210 may help track responsibility and accountability for customer relationships and sales activities.

The territory data 212 may include data corresponding to geographical and/or market segments assigned to users or teams within the CRM 202. For example, territories can be defined by geographic regions, industry sectors, or customer types. Such information may be used to allocate resources and manage efforts according to strategic priorities.

According to some embodiments, the data cloud platform 222 may implement a data lake architecture and store and manage various types of data, such as account data lake objects (DLOs) and data model objects. In this example, the data cloud platform 222 includes account DLO/DMOs 224, account-contact DMOs 226, individual DMOs 228, Unified-Individual DMOs 230, and segmentation data 232.

The account DLO/DMOs 224 may include account data lake objects (DLOs) and account data model objects (DMOs). For example, an account DLO may contain raw data related to an account. The account DLO may be associated with various account details, such as account ID, account name, contact information (e.g., email, address, etc.), industry type, and other relevant information. As another example, an account DMO may organize and standardize account-related data from DLOs into a structured format.

The account-contact DMOs 226 may describe relationships between accounts and their associated contacts. The account-contact DMOs 226 may provide a structured view of how individuals (e.g., contacts) are linked to specific organizations (e.g., accounts), including roles and responsibilities within those accounts.

The individual DMOs 228 may describe people who interact with a given business (e.g., account), such as customers or contacts. The individual DMOs 228 may capture and apply personal attributes like names, contact details, demographic information, among other relevant information, for example, to create comprehensive profiles of individuals for personalized engagement.

The UnifiedIndividual DMOs 230 may consolidate data from various sources to create a single, unified profile of an individual. For example, a UnifiedIndividual DMO for an individual may involve using identity resolution techniques to merge disparate data into one coherent view of the individual.

The segmentation data 232 may include DMOs organizing groups (or segments) defined by specific segmentation criteria for various purposes, such as marketing. For example, segments may be used to target promotions and campaigns more effectively by categorizing individuals based on behaviors, preferences, demographics, or other relevant factors. In this example, the segmentation may allow an organization to tailor their marketing strategies to specific groups for better engagement and conversion rates.

Figure 5:
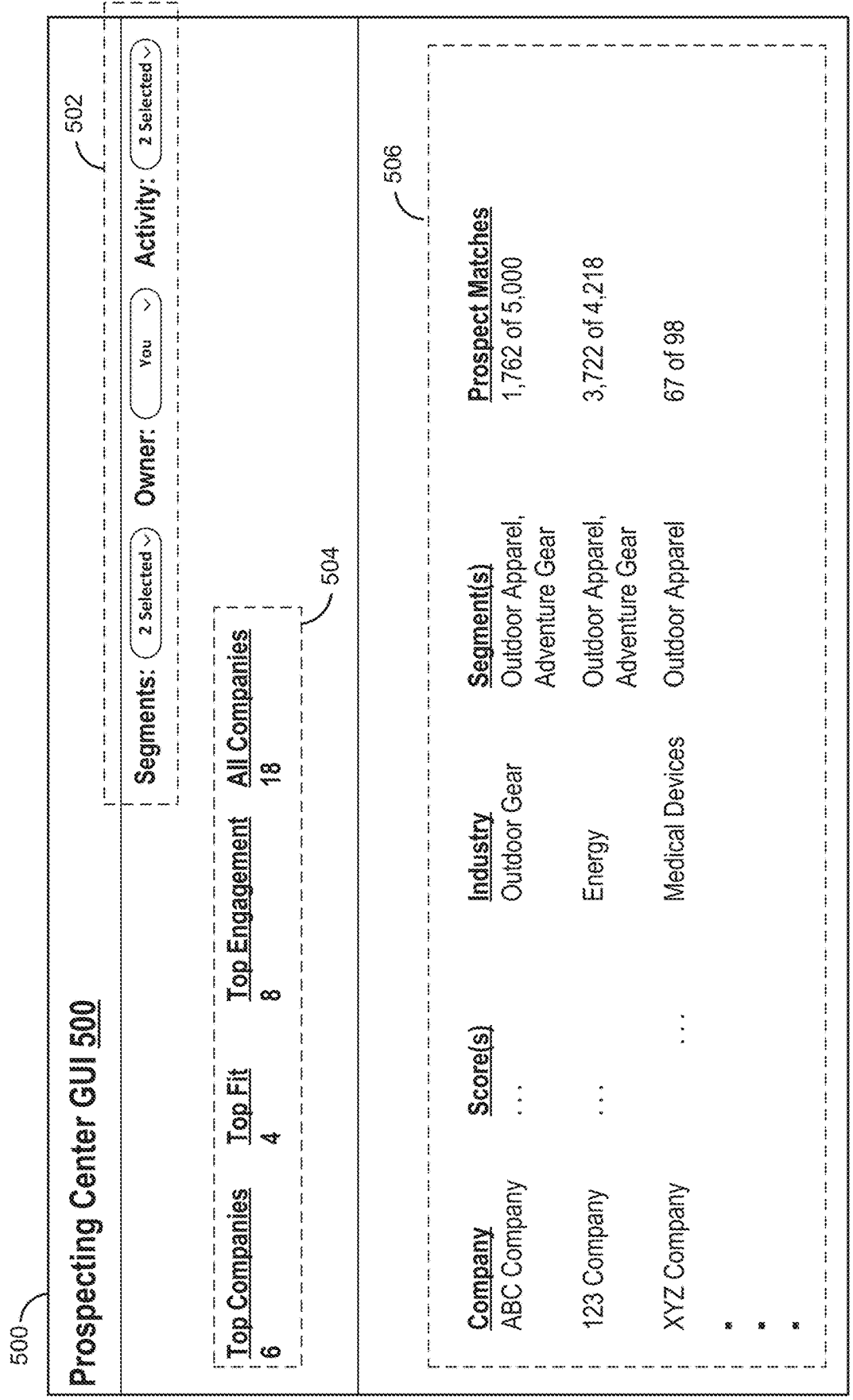
FIG. 5 shows an example graphical user interface (GUI), according to some embodiments.
Figure 6:
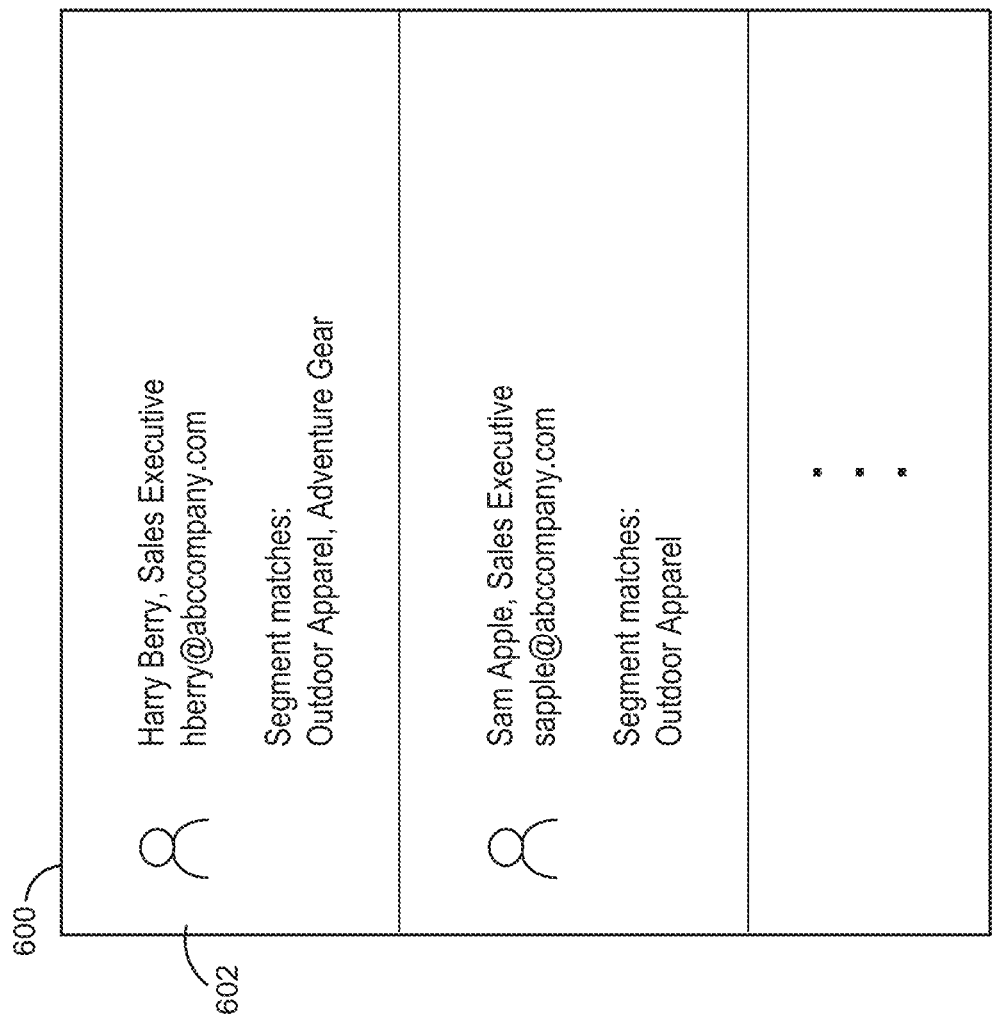
FIG. 6 shows another example graphical user interface (GUI), according to some embodiments.

In various embodiments, data from the CRM 202 may be merged with data from the data cloud platform 222, as described herein. The merged data may be presented in one or more graphical user interfaces (GUIs) 242 accessible to users of a CRM system, such as the computer system 110. For example, FIGS. 5 and 6 illustrate example GUIs, according to various embodiments.

Figure 3:
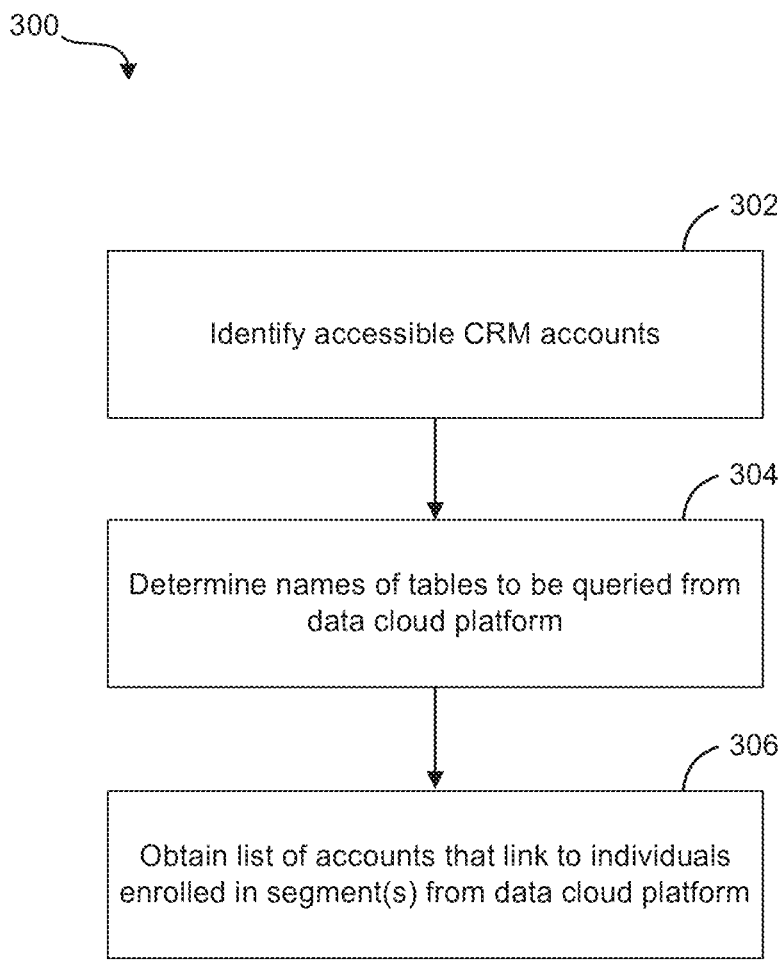
FIG. 3 shows a flow diagram of an example process for integrating data from disparate data sources, according to some embodiments.

FIG. 3 shows a flow diagram of an example process for integrating data from disparate data sources, according to some embodiments. The process 300 can be performed by one or more processors of a computer system, such as the computer system 110 of FIG. 1, for example, upon executing the data integration application 114. The computer system may interact with a data cloud platform, such as the computer system 130 of FIG. 1.

Figure 4:
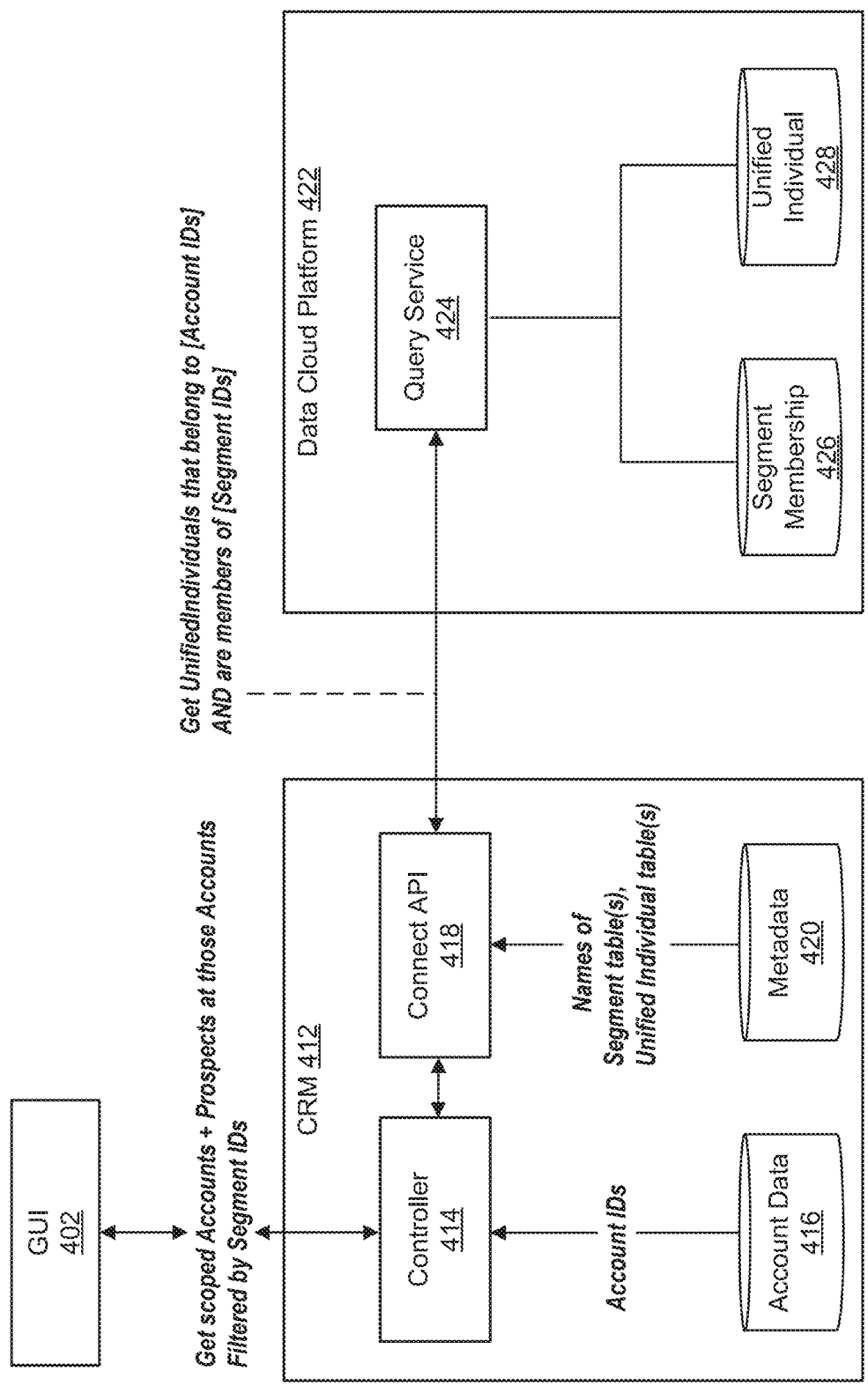
FIG. 4 shows an example environment for integrating data from disparate data sources, according to some embodiments.

At block 302, CRM accounts that are accessible to a user of the computer system may be identified. The user may be interacting with the computer system through a graphical user interface (GUI), for example, as shown in FIGS. 4-6. According to various embodiments, the user may interact with the GUI to obtain information describing a list of accounts and individuals associated with (i) the list of accounts and (ii) one or more requested segments. In such embodiments, the computer system may query CRM data to determine all account IDs that are owned (or managed, or accessible) by the user. The account IDs may be used in combination with segment IDs of the requested segment(s), as described herein. In various embodiments, to ensure records are presented in a requested order, for example, based on user preference, the sort order may be determined in post-processing performed by the CRM (e.g., the computer system 110), rather than at the query level.

At block 304, names of tables to be queried from the data cloud platform may be determined. For example, the names of the tables may be determined based on metadata residing in CRM data maintained by the computer system.

In various embodiments, the computer system may determine names of one or more unified individual tables by calling an application programming interface (API) endpoint (e.g., "ssot/profile/metadata"). For example, a unified individual table may consolidate various data points about individuals associated with an account into unified profiles. A unified profile may be created through an identity resolution process that merges information from multiple sources, ensuring data is accurately represented and synchronized. The unified individual table may include various information, such as personal details (e.g., name, contact information), demographic data, interaction history (e.g., purchases, website visits, service requests), and preferences. As a result, the unified individual table may provide a holistic view of individuals associated with an account.

In response to the API call, the API endpoint may return information describing data objects managed by the data cloud platform. For example, the information may be provided in Javascript Object Notation (JSON) format. In this example, the JSON may be parsed to identify a data object having a key "referenceModelEntityDeveloperName" with a value of "UnifiedIndividual". This indicates that the entry is related to a unified individual table. Based on this entry, the computer system may extract relevant information, such as the name of the unified individual table or any other metadata needed to work with unified profiles. In some embodiments, a first unified individual table (e.g., oldest, most recent, etc.) is used in the event a user is defined in more than one unified individual table.

In various embodiments, the computer system may determine one or more segment membership table names. For example, each segment may be associated with a segment ID and its own membership criteria based on which data objects are automatically enrolled. For example, data objects corresponding to individuals (e.g., Individual DMOs) may be automatically enrolled into a given segment upon satisfying membership criteria associated with the segment. Segmentation may involve categorizing profiles that share common attributes or behaviors, for example, using filters and conditions to define membership criteria for inclusion in a segment. For example, a segment might include customers over the age of 30 residing in a particular zip code who have high loyalty points and have interacted with recent emails. In general, segments may range from demographic-based groups, such as age or location, to behavior-based segments that focus on customer interactions like website visits or purchase history.

In some embodiments, the process of creating segments may involve selecting a Data Model Object (DMO) as the basis, choosing relevant attributes from an attribute library, and defining membership criteria that profiles must meet to be included in the segment. Once a segment is defined, the segment may automatically be populated with unified profiles that fit its membership criteria. Such automatic enrollment may help ensure that segments remain up-to-date and accurately reflect the target audience, for example, in marketing campaigns or other initiatives. Since segmentation may occur at various intervals as scheduled jobs, the computer system may determine the latest (or most recent) segment membership table(s). For example, the computer system may use the following query to obtain the latest segment membership table(s):

SELECT NamespacePrefix, DeveloperName
FROM MktDataModelObject
WHERE Source='Unified_Individual_Table' AND CreationType='Segment_Membership' AND RefEntityDeveloperName='Segment_Member_Latest'.

In this query, the SELECT part of the query specifies NamespacePrefix and DeveloperName fields to be retrieved. These fields may help identify the specific Data Model Object (DMO) related to the latest segment membership. The FROM part of the query may indicate that the data is being queried from the MktDataModelObject, which contains metadata about marketing data models and may be maintained as CRM data. The WHERE part of the query filters the results to include only those objects that are included in the unified individual table and are created as part of segment memberships. The AND part of the query further narrows down the results to those records where the reference entity developer name corresponds to Segment_Member_Latest, e.g., the latest published segment membership data. The actual SegmentMembership DMO table name may be derived based on the results of this query. For example, the name of the SegmentMembership DMO table may be extracted from the tableName field from a given entry.

In various embodiments, once names of the unified individual table(s) and the segment membership table(s) are obtained, the names of the unified individual table(s) and the segment membership table(s) may be processed (or formatted) as follows:

if NamespacePrefix.isEmpty then {DeveloperName}_dlm
else {NamespacePrefix}_{DeveloperName}_dlm.

At block 306, information describing accounts that link to individuals enrolled in requested segment(s) may be obtained from the data cloud platform. In various embodiments, the computer system may execute a DMO query to an API (e.g., "/ssot/queryv2") against the SegmentMembership DMO using the account IDs obtained earlier. An example DMO query is as follows:

SELECT ind.ssot_Id_c, ind.ssot_PrimaryAccountId_c, segment.Segment_Id_c
FROM <SegmentMembershipTableName> segment
INNER JOIN <UnifiedIndividualTableName> ind
ON segment.Id_c=ind.ssot_Id_c
WHERE segment.Segment_Id_c IN (<SegmentIdsList>)
AND ind.ssot_PrimaryAccountId_c IN (<AccountIdsList>)
AND segment.Delta_Type_c!='removed' Order By ind.ssot_PrimaryAccountId_c,
  where SegmentMembershipTableName is the name of the most recent segment membership table, where UnifiedIndividualTableName is the name of the unified individual table, where SegmentIdsList is the list of segment IDs, and where AccountIdsList is the list of account IDs. Upon executing this query, the computer system may obtain a list of segment members that matched the filter criteria, their primary account ID, their source (or contact) record ID from the CRM system (if applicable), and any segment IDs they satisfied.

In various embodiments, to ensure records are presented in a requested order while maintaining pagination limits, the query to the data cloud platform may be divided into corresponds blocks and then queried based on the requested sort order. In various embodiments, queries may be reformulated and executed based on user input, such as when a user changes sort order or the user selects or de-selects segments.

FIG. 4 shows an example environment for integrating data from disparate data sources, according to some embodiments. For example, FIG. 4 shows a GUI 402, a CRM 412, and a data cloud platform 422. In this example, the CRM 412 may be implemented as the computer system 110 of FIG. 1 and the data cloud platform 422 may be implemented as the computer system 130 of FIG. 1. The GUI 402 may be accessible to a user of a user system, such as the user system 120 of FIG. 1. The user may interact with the GUI 402 to access various data obtained from both the CRM 412 and the data cloud platform 422, as described herein.

In various embodiments, the GUI 402 may provide a prospecting center, which may allow users to specify options to combine their data in the CRM 412 with additional data, such as data lake objects (DLOs) and data model objects (DMOs), maintained by the data cloud platform 422. As a result, such combination may facilitate integration of segmentation data maintained by the data cloud platform 422 with CRM records maintained by the CRM 412 to provide additional insights, such as identification of prospects at existing accounts that correspond to selected segments. In various embodiments, the combination may be achieved using serial queries and merging the results in post-query memory.

According to some embodiments, one or more segments may be determined, for example, based on options selected in the GUI 402. For example, FIG. 5 shows an example GUI 500 with a set of options 502. In various embodiments, the options may include a segment option that allows selection of one or more segments based on which data from the data cloud platform 422 may be filtered.

According to FIG. 4, a controller 414 in the CRM 412 may be configured to determine a list of accounts (e.g., account IDs) that are accessible to an owner, for example, as defined by the selected options. For example, if an ownership option specifies the user interacting with the GUI 402, the controller 414 may obtain a list of accounts that are accessible to that user. In various embodiments, to determine the list of accounts, the controller 414 may query account data 416, which may correspond to the account data 204, as described in reference to block 302 of FIG. 3.

The controller 414 may interact with a Connect API 418 to obtain names of segment membership table(s) and unified individual table(s), for example, by querying metadata 420, as described in reference to block 304 of FIG. 3. The metadata 420 may be maintained by the CRM 412 and may provide locations of relevant tables (e.g., segment membership tables, unified individual tables). In various embodiments, table names may be processed, as described in reference to block 304 of FIG. 3.

The controller 414 may interact with the Connect API 418 to query, filter, and join data from the data cloud platform 422, as described in reference to block 306 of FIG. 3. In various embodiments, the Connect API 418 may receive a list of account IDs and a list of segment IDs to filter by as input. The Connect API 418 may interact with a query service 424 to determine names for the unified individual and segment membership tables, for example, from segment membership data 426 and unified individual data 428. In various embodiments, the table names may be used along with account IDs and segment IDs to render a templated structured query language (SQL) query (e.g., retrieve UnifiedIndividuals that belong to <account IDs> AND are members of <segment IDs>). In some embodiments, the query may be executed via a gRPC streaming query endpoint whose results may be collated and returned in real-time (or near real-time). The gRPC streaming query endpoint is a feature of the gRPC framework that allows continuous data exchange between a client and a server using streams, rather than the traditional request-response model. In various embodiments, the Connect API 418 may output a list of accounts with each account containing a list of unified individuals and segments that the account matched. These results may be provided in a return payload that the GUI 402 uses to display each account with its matched individuals, and the list of segments that those individuals satisfied.

FIG. 5 shows an example graphical user interface (GUI), according to some embodiments. For example, FIG. 5 illustrates an example GUI 500. In various embodiments, an initial view of the GUI 500 may be determined based on a query to select all accounts accessible to a user of the GUI 500 and a query to identify all active segments (e.g., "Select all active MarketSegments where SegmentedOn=UnifiedIndividual"). The user may then select from those unified individual segments to further filter their accounts. For example, the GUI 500 may include a set of options 502 that may be used to filter data. In various embodiments, the set of options 502 may include a segment option that allows selection of one or more segments based on which data may be filtered. In various embodiments, filtering a list of accounts by segments involves filtering by unified individuals who both have their primary account ID in the list of accounts and are also members of selected segment(s).

According to some embodiments, the set of options 502 may include additional filters, such as ownership and activity, which may be used to filter data, for example, from the CRM 412. In various embodiments, an ownership filter may allow users to view CRM records based on who owns them (e.g., Mine, My Team, My Account teams, My Territories' Accounts, etc.), which may be useful for teams that manage specific accounts or territories. For example, a user interacting with the GUI 500 may select an option to view all accounts owned by that user. As another example, a user may select an option to view all accounts owned by members of a sales team managed by the user. Many variations are possible. By applying ownership filters, users can quickly access data relevant to their responsibilities, such as accounts, leads, or opportunities they personally manage. In various embodiments, an activity filter may be used to sort and display records based on recent interactions or activity (e.g., date literals, last 90 days, last 180 days, last 365 days, all time, never, custom date range). As an example, the Account.LastActivityDate value for an account may be used to determine a last interaction with the account. Such activity filters may help prioritize records that have had recent customer engagement or changes, enabling users to follow up promptly on active deals or customer inquiries.

The GUI 500 may also provide various scores (e.g., KPI metrics) 504 associated with accounts, such as "Top Companies", "Top Fit", "Top Engagement", and "All Companies". The scores may be determined and managed by a CRM, such as the computer system 110.

The GUI 500 may provide a customizable records view 506 in which desired fields may be selected for viewing. For example, each row may provide the name of an account (e.g., Company) with corresponding score(s) (e.g., Account Score, Fit Score, Engagement Score, etc.), and industry. In various embodiments, the records view 506 may include additional synthetic fields, such as "Segments", which identifies segments in which the accounts' prospects are included, and "Prospect Matches", which is the number of individuals on this account that are part of the selected segments. In various embodiments, to ensure records are presented in a requested order, for example, based on user preference, the sort order for the customizable records view 506 may be determined in post-processing performed by the CRM (e.g., the computer system 110), rather than at the query level. The user may interact with each row to act upon prospects as a group by clicking a dropdown button or by using a side panel to view the list of prospects.

FIG. 6 shows another example graphical user interface (GUI), according to some embodiments. In FIG. 6, the GUI 600 provides a detailed side panel showing prospective matches for a given account (e.g., "ABC Company"). For a given prospective match 602, the GUI 600 may provide a corresponding name, title, contact information, and any matching segments.

Figure 7:
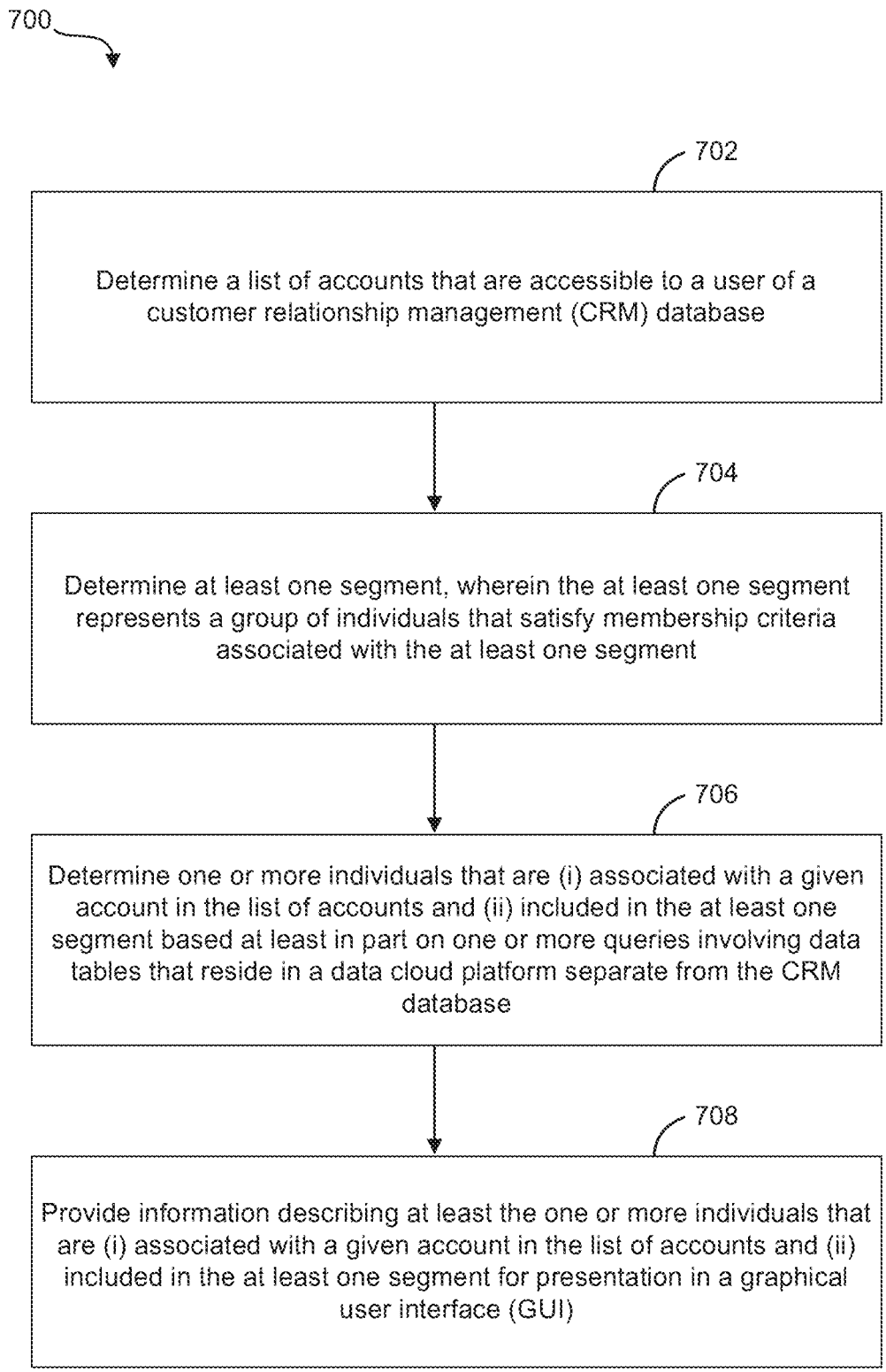
FIG. 7 shows a flow diagram of an example process, according to some embodiments.

FIG. 7 shows a flow diagram of an example process 700, according to some embodiments. The process 700 can be performed by one or more processors of a computer system, such as the computer system 110 of FIG. 1.

At block 702, the computer system determines a list of accounts that are accessible to a user of a customer relationship management (CRM) database. In some embodiments, the list of accounts is determined based on one or more queries to the CRM database.

At block 704, the computer system determines at least one segment, wherein the at least one segment represents a group of individuals that satisfy membership criteria associated with the at least one segment. In some embodiments, the at least one segment is identified based on a selection of a corresponding option as provided in the GUI. In some embodiments, the at least one segment is dynamically generated and maintained by the data cloud platform.

At block 706, the computer system determines one or more individuals that are (i) associated with a given account in the list of accounts and (ii) included in the at least one segment based at least in part on one or more queries involving one or more data tables that reside in a data cloud platform separate from the CRM database. In some embodiments, the one or more data tables that reside in the data cloud platform are identified based at least in part on metadata maintained by the CRM database. According to some embodiments, the one or more individuals may be determined by identifying one or more unified individual data tables maintained by the data cloud platform that provide information describing individuals; identifying at least one segment membership table maintained by the data cloud platform corresponding to the at least one segment; and providing at least one query to the data cloud platform to determine the one or more individuals that are associated with the list of accounts and are members of the at least one segment based at least in part on the one or more unified individual data tables and the at least one segment membership table. In some embodiments, the at least one query is divided into corresponding blocks, which are submitted as queries based at least in part on a requested sort order or pagination limit associated with the GUI. In some embodiments, the at least one query is executed via a gRPC streaming query endpoint.

At block 708, the computer system provides information describing at least the one or more individuals that are (i) associated with a given account in the list of accounts and (ii) included in the at least one segment for presentation in a graphical user interface (GUI), for example, as shown in FIG. 5. In some embodiments, information describing an individual associated with a given account provides at least a corresponding name, title, contact details, and any segments of which the individual is a member.

Figure 8A:
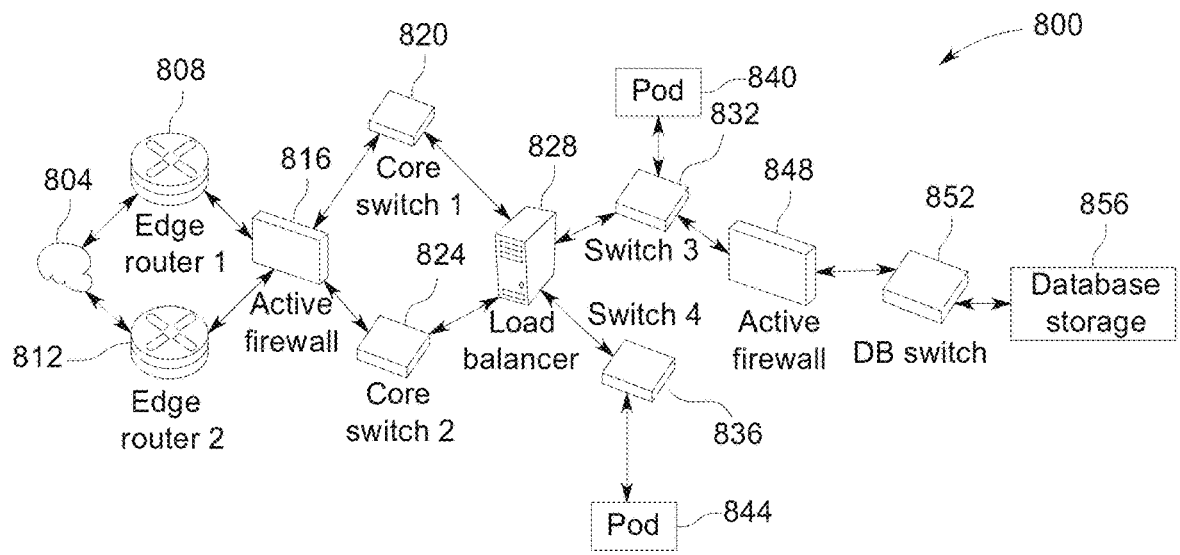
FIG. 8A shows a system diagram illustrating architectural components of an applicable environment, in accordance with some implementations.

FIG. 8A shows a system diagram illustrating architectural components of an on-demand service environment 800, in accordance with some implementations. For instance, the on-demand service environment 800 may correspond to an implementation of computing environment 100 in FIG. 1. A client machine located in the cloud 804 (or Internet) may communicate with the on-demand service environment via one or more edge routers 808 and 812. The edge routers may communicate with one or more core switches 820 and 824 via firewall 816. The core switches may communicate with a load balancer 828, which may distribute server load over different pods, such as pods 840 and 844. The pods 840 and 844, which may each include one or more servers and/or other computing resources, may perform data processing and other operations used to provide on-demand services. Communication with the pods may be conducted via pod switches 832 and 836. Components of the on-demand service environment may communicate with a database storage system 856 via a database firewall 848 and a database switch 852.

Figure 8B:
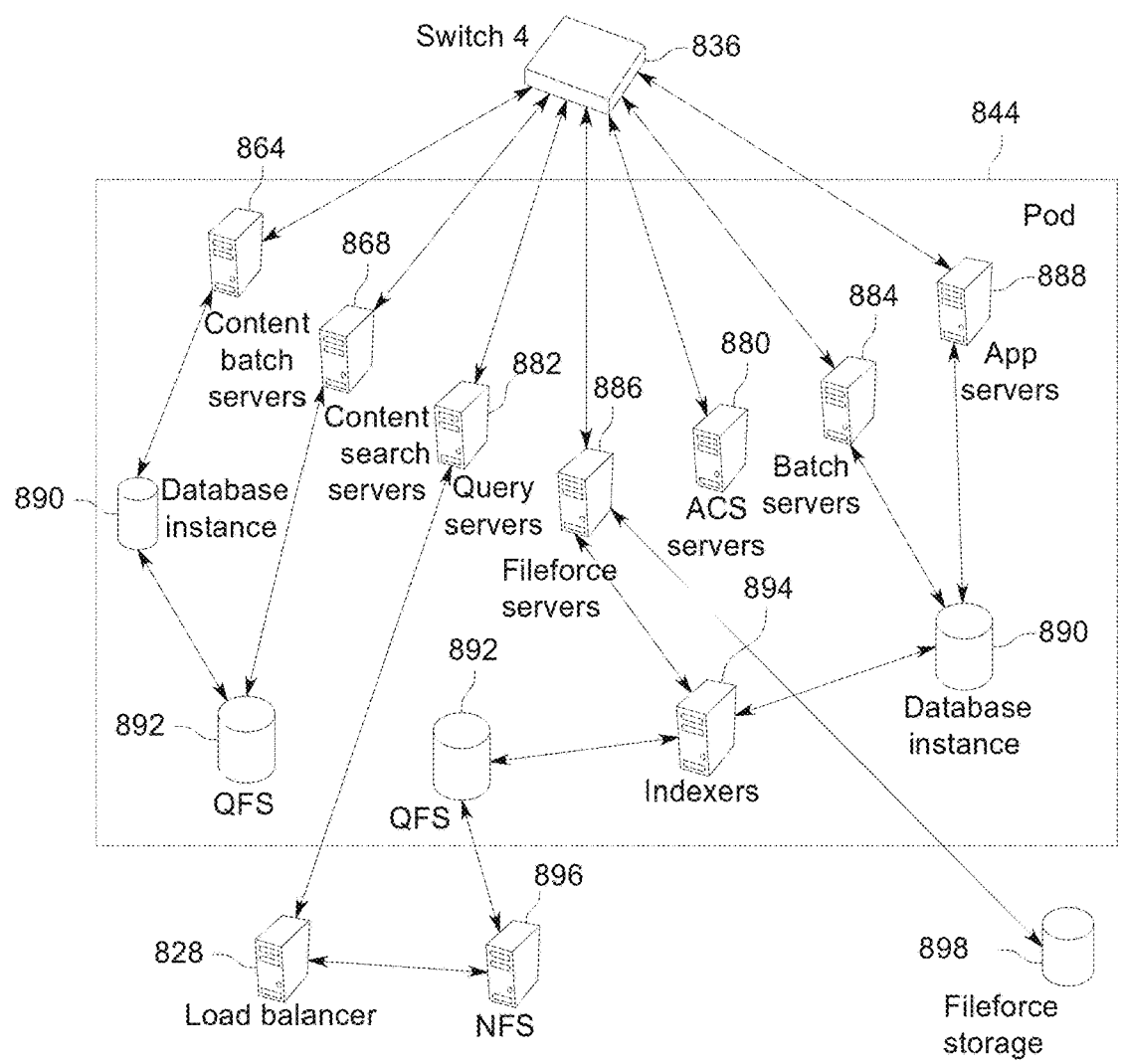
FIG. 8B shows a system diagram further illustrating architectural components of an applicable environment, in accordance with some implementations.

As shown in FIGS. 8A and 8B, accessing an on-demand service environment may involve communications transmitted among a variety of different hardware and/or software components. Further, the on-demand service environment 800 is a simplified representation of an actual on-demand service environment. For example, while only one or two devices of each type are shown in FIGS. 8A and 8B, some implementations of an on-demand service environment may include anywhere from one to many devices of each type. Also, the on-demand service environment need not include each device shown in FIGS. 8A and 8B or may include additional devices not shown in FIGS. 8A and 8B.

Moreover, one or more of the devices in the on-demand service environment 800 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 804 is intended to refer to a data network or plurality of data networks, often including the Internet. Client machines located in the cloud 804 may communicate with the on-demand service environment to access services provided by the on-demand service environment. For example, client machines may access the on-demand service environment to retrieve, store, edit, and/or process information.

In some implementations, the edge routers 808 and 812 route packets between the cloud 804 and other components of the on-demand service environment 800. The edge routers 808 and 812 may employ the Border Gateway Protocol (BGP). The BGP is the core routing protocol of the Internet. The edge routers 808 and 812 may maintain a table of IP networks or 'prefixes' which designate network reachability among autonomous systems on the Internet.

In one or more implementations, the firewall 816 may protect the inner components of the on-demand service environment 800 from Internet traffic. The firewall 816 may block, permit, or deny access to the inner components of the on-demand service environment 800 based upon a set of rules and other criteria. The firewall 816 may act as one or more of a packet filter, an application gateway, a stateful filter, a proxy server, or any other type of firewall.

In some implementations, the core switches 820 and 824 are high-capacity switches that transfer packets within the on-demand service environment 800. The core switches 820 and 824 may be configured as network bridges that quickly route data between different components within the on-demand service environment. In some implementations, the use of two or more core switches 820 and 824 may provide redundancy and/or reduced latency.

In some implementations, the pods 840 and 844 may perform the core data processing and service functions provided by the on-demand service environment. Each pod may include various types of hardware and/or software computing resources. An example of the pod architecture is discussed in greater detail with reference to FIG. 8B.

In some implementations, communication between the pods 840 and 844 may be conducted via the pod switches 832 and 836. The pod switches 832 and 836 may facilitate communication between the pods 840 and 844 and client machines located in the cloud 804, for example via core switches 820 and 824. Also, the pod switches 832 and 836 may facilitate communication between the pods 840 and 844 and the database storage 856.

In some implementations, the load balancer 828 may distribute workload between the pods 840 and 844. Balancing the on-demand service requests between the pods may assist in improving the use of resources, increasing throughput, reducing response times, and/or reducing overhead. The load balancer 828 may include multilayer switches to analyze and forward traffic.

In some implementations, access to the database storage 856 may be guarded by a database firewall 848. The database firewall 848 may act as a computer application firewall operating at the database application layer of a protocol stack. The database firewall 848 may protect the database storage 856 from application attacks such as structure query language (SQL) injection, database rootkits, and unauthorized information disclosure.

In some implementations, the database firewall 848 may include a host using one or more forms of reverse proxy services to proxy traffic before passing it to a gateway router. The database firewall 848 may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some implementations, communication with the database storage system 856 may be conducted via the database switch 852. The multi-tenant database system 856 may include more than one hardware and/or software components for handling database queries. Accordingly, the database switch 852 may direct database queries transmitted by other components of the on-demand service environment (e.g., the pods 840 and 844) to the correct components within the database storage system 856. In some implementations, the database storage system 856 is an on-demand database system shared by many different organizations. The on-demand database system may employ a multi-tenant approach, a virtualized approach, or any other type of database approach. An on-demand database system is discussed in greater detail with reference to FIGS. 9 and 10.

FIG. 8B shows a system diagram illustrating the architecture of the pod 844, in accordance with one implementation. The pod 844 may be used to render services to a user of the on-demand service environment 800. In some implementations, each pod may include a variety of servers and/or other systems. The pod 844 includes one or more content batch servers 864, content search servers 868, query servers 882, Fileforce servers 886, access control system (ACS) servers 880, batch servers 884, and app servers 888. Also, the pod 844 includes database instances 890, quick file systems (QFS) 892, and indexers 894. In one or more implementations, some or all communication between the servers in the pod 844 may be transmitted via the switch 836.

In some implementations, the application servers 888 may include a hardware and/or software framework dedicated to the execution of procedures (e.g., programs, routines, scripts) for supporting the construction of applications provided by the on-demand service environment 800 via the pod 844. Some such procedures may include operations for providing the services described herein. The content batch servers 864 may handle requests internal to the pod. These requests may be long-running and/or not tied to a particular customer. For example, the content batch servers 864 may handle requests related to log mining, cleanup work, and maintenance tasks.

The content search servers 868 may provide query and indexer functions. For example, the functions provided by the content search servers 868 may allow users to search through content stored in the on-demand service environment. The Fileforce servers 886 may manage requests for information stored in the Fileforce storage 898. The Fileforce storage 898 may store information such as documents, images, and basic large objects (BLOBs). By managing requests for information using the Fileforce servers 886, the image footprint on the database may be reduced.

The query servers 882 may be used to retrieve information from one or more file systems. For example, the query servers 882 may receive requests for information from the app servers 888 and then transmit information queries to network file systems (NFS) 896 located outside the pod. The pod 844 may share a database instance 890 configured as a multi-tenant environment in which different organizations share access to the same database. Additionally, services rendered by the pod 844 may require various hardware and/or software resources. In some implementations, the ACS servers 880 may control access to data, hardware resources, or software resources.

In some implementations, the batch servers 884 may process batch jobs, which are used to run tasks at specified times. Thus, the batch servers 884 may transmit instructions to other servers, such as the app servers 888, to trigger the batch jobs. For some implementations, the QFS 892 may be an open source file system available from Sun Microsystems® of Santa Clara, California. The QFS may serve as a rapid-access file system for storing and accessing information available within the pod 844. The QFS 892 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 868 and/or indexers 894 to identify, retrieve, move, and/or update data stored in the NFS 896 and/or other storage systems.

In some implementations, one or more query servers 882 may communicate with the NFS 896 to retrieve and/or update information stored outside of the pod 844. The NFS 896 may allow servers located in the pod 844 to access information to access files over a network in a manner similar to how local storage is accessed. In some implementations, queries from the query servers 882 may be transmitted to the NFS 896 via the load balancer 828, which may distribute resource requests over various resources available in the on-demand service environment. The NFS 896 may also communicate with the QFS 892 to update the information stored on the NFS 896 and/or to provide information to the QFS 892 for use by servers located within the pod 844.

In some implementations, the pod may include one or more database instances 890. The database instance 890 may transmit information to the QFS 892. When information is transmitted to the QFS, it may be available for use by servers within the pod 844 without requiring an additional database call. In some implementations, database information may be transmitted to the indexer 894. Indexer 894 may provide an index of information available in the database 890 and/or QFS 892. The index information may be provided to Fileforce servers 886 and/or the QFS 892.

Figure 9:
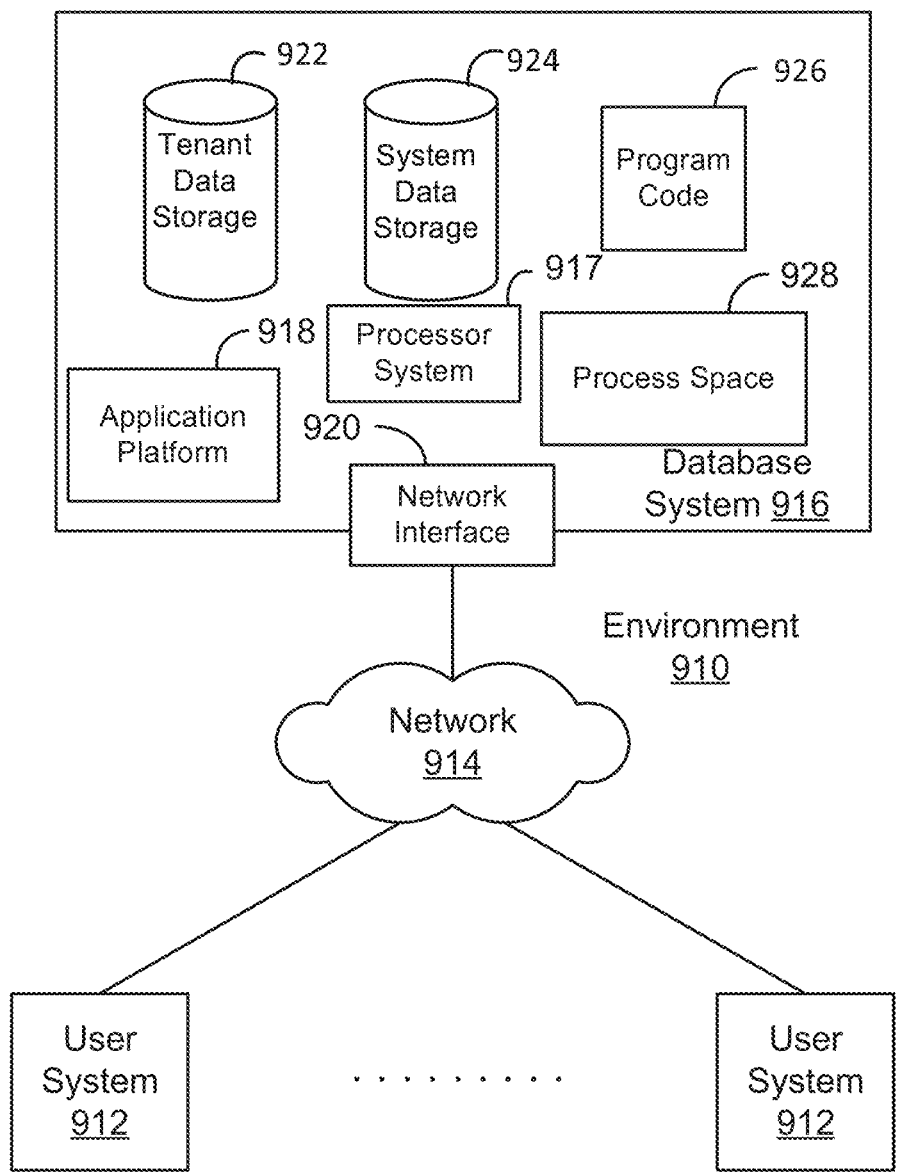
FIG. 9 shows a system diagram illustrating the architecture of a multi-tenant database environment, in accordance with some implementations.
Figure 10:
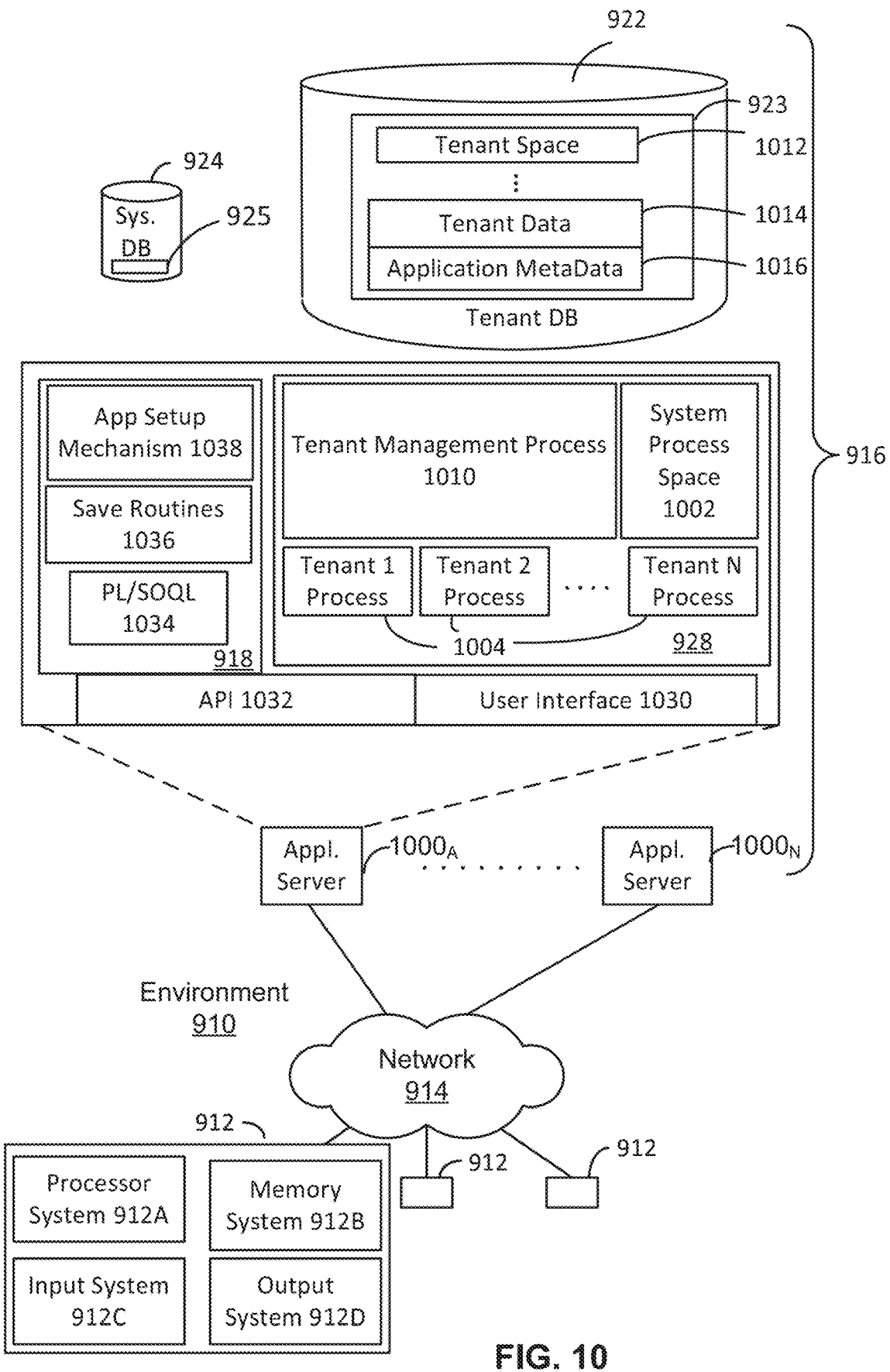
FIG. 10 shows a system diagram further illustrating the architecture of a multi-tenant database environment, in accordance with some implementations.

FIG. 9 shows a block diagram of an environment 910 wherein an on-demand database service might be used, in accordance with some implementations. Environment 910 includes an on-demand database service 916. User system 912 may be any machine or system that is used by a user to access a database user system. For example, any of user systems 912 can be a handheld computing system, a mobile phone, a laptop computer, a workstation, and/or a network of computing systems. As illustrated in FIGS. 9 and 10, user systems 912 might interact via a network 914 with the on-demand database service 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein. A database image may include one or more database objects. A relational database management system (RDBMS) or the equivalent may execute storage and retrieval of information against the database object(s). Application platform 918 may be a framework that allows the applications of system 916 to run, such as the hardware and/or software, e.g., the operating system. In an implementation, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

The users of user systems 912 may differ in their respective capacities, and the capacity of a particular user system 912 might be entirely determined by permissions (permission levels) for the current user. For example, where a call center agent is using a particular user system 912 to interact with system 916, the user system 912 has the capacities allotted to that call center agent. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some implementations are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some implementations, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In some implementations, system 916, shown in FIG. 9, implements a web-based customer relationship management (CRM) system. For example, in some implementations, system 916 includes application servers configured to implement and execute CRM software applications as well as provide related data, code, forms, webpages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain implementations, system 916 implements applications other than, or in addition to, a CRM application. For example, system 916 may provide tenant access to multiple hosted (standard and custom) applications. User (or third party developer) applications, which may or may not include CRM, may be supported by the application platform 918, which manages creation, storage of the applications into one or more database objects and executing of the applications in a virtual machine in the process space of the system 916.

Each user system 912 could include a desktop personal computer, workstation, laptop, PDA, cell phone, or any wireless access protocol (WAP) enabled device or any other computing system capable of interfacing directly or indirectly to the Internet or other network connection. User system 912 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914.

Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, implementations are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to some implementations, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units.

A computer program product implementation includes a machine-readable storage medium (media) having instructions stored thereon/in which can be used to program a computer to perform any of the processes of the implementations described herein. Computer code for operating and configuring system 916 to intercommunicate and to process webpages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for carrying out disclosed operations can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to some implementations, each system 916 is configured to provide webpages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computing system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 10 also shows a block diagram of environment 910 further illustrating system 916 and various interconnections, in accordance with some implementations. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers 1000A-1000N, system process space 1002, tenant process spaces 1004, tenant management process space 1010, tenant storage area 1012, user storage 1014, and application metadata 1016. In other implementations, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of processors. Memory system 912B may be any combination of one or more memory devices, short term, and/or long term memory. Input system 912C may be any combination of input devices, such as keyboards, mice, trackballs, scanners, cameras, and/or interfaces to networks. Output system 912D may be any combination of output devices, such as monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as Oracle™ databases.

Application platform 918 includes an application setup mechanism 1038 that supports application developers' creation and management of applications, which may be saved as metadata into tenant data storage 922 by save routines 1036 for execution by subscribers as tenant process spaces 1004 managed by tenant management process 1010 for example. Invocations to such applications may be coded using PL/SOQL 1034 that provides a programming language style interface extension to API 1032. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by system processes, which manage retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server 1000 might be coupled via the network 914 (e.g., the Internet), another application server 1000 might be coupled via a direct network link, and another application server 1000 might be coupled by yet a different network connection. Transfer Control Protocol and Internet Protocol (TCP/IP) are typical protocols for communicating between application servers 1000 and the database system. However, other transport protocols may be used to optimize the system depending on the network interconnect used.

In certain implementations, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In some implementations, therefore, an interface system implementing a load balancing function (e.g., an F5 Big-IP load balancer) is communicably coupled between the application servers 1000 and the user systems 912 to distribute requests to the application servers 1000. In some implementations, the load balancer uses a least connections algorithm to route user requests to the application servers 1000. Other examples of load balancing algorithms, such as round robin and observed response time, also can be used. For example, in certain implementations, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each call center agent uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain implementations, user systems 912 (which may be client machines/systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. In some implementations, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-program product that include program instructions, state information, etc., for performing various operations described herein. Examples of program instructions include both machine code, such as produced by a compiler, and files containing higher-level code that may be executed by the computer using an interpreter. Examples of machine-program product include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more implementations and techniques are described with reference to an implementation in which a service cloud console is implemented in a system having an application server providing a front end for an on-demand database service capable of supporting multiple tenants, the one or more implementations and techniques are not limited to multi-tenant databases nor deployment on application servers. Implementations may be practiced using other database architectures, i.e., ORACLE®, DB2® by IBM and the like without departing from the scope of the implementations claimed.

Any of the above implementations may be used alone or together with one another in any combination. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

While various implementations have been described herein, it should be understood that they have been presented by way of example only, and not limitation. Thus, the breadth and scope of the present application should not be limited by any of the implementations described herein but should be defined only in accordance with the following and later-submitted claims and their equivalents.

What is claimed is:

1. A computer-implemented method comprising:
   determining, by a computing system, a list of accounts that are accessible to a user of a customer relationship management (CRM) database;
   determining, by the computing system, at least one segment, wherein the at least one segment represents a group of individuals that satisfy membership criteria associated with the at least one segment;
   determining, by the computing system, one or more individuals that are (i) associated with a given account in the list of accounts and (ii) included in the at least one segment based at least in part on one or more queries involving one or more data tables that reside in a data cloud platform separate from the CRM database; and
   providing, by the computing system, information describing at least the one or more individuals that are (i) associated with a given account in the list of accounts and (ii) included in the at least one segment for presentation in a graphical user interface (GUI).

2. The computer-implemented method of claim 1, wherein the at least one segment is dynamically generated and maintained by the data cloud platform.

3. The computer-implemented method of claim 1, wherein the one or more data tables that reside in the data cloud platform are identified based at least in part on metadata maintained by the CRM database.

4. The computer-implemented method of claim 1, wherein the list of accounts that are accessible to the user is determined based on one or more queries to the CRM database.

5. The computer-implemented method of claim 1, wherein the at least one segment is identified based on a selection of a corresponding option as provided in the GUI.

6. The computer-implemented method of claim 1, wherein determining the one or more individuals comprises:
identifying, by the computing system, one or more unified individual data tables maintained by the data cloud platform that provide information describing individuals;
identifying, by the computing system, at least one segment membership table maintained by the data cloud platform corresponding to the at least one segment; and
providing, by the computing system, at least one query to the data cloud platform to determine the one or more individuals that are associated with the list of accounts and are members of the at least one segment based at least in part on the one or more unified individual data tables and the at least one segment membership table.

7. The computer-implemented method of claim 6, wherein the at least one query is divided into corresponding blocks, and wherein the blocks are submitted as queries based at least in part on a requested sort order or pagination limit associated with the GUI.

8. The computer-implemented method of claim 6, wherein the at least one query is executed via a gRPC streaming query endpoint.

9. The computer-implemented method of claim 1, further comprising:
providing, by the computing system, an initial graphical user interface (GUI) that includes a view of the list of accounts and provides one or more options for filtering the list of accounts based on at least in part on one or more segments.

10. The computer-implemented method of claim 1, wherein information describing an individual associated with a given account provides at least a corresponding name, title, contact details, and any segments of which the individual is a member.

11. A computer system comprising:
one or more processors; and
memory storing instructions that, when executed, cause the one or more processors to perform:
determining a list of accounts that are accessible to a user of a customer relationship management (CRM) database;
determining at least one segment, wherein the at least one segment represents a group of individuals that satisfy membership criteria associated with the at least one segment;
determining one or more individuals that are (i) associated with a given account in the list of accounts and (ii) included in the at least one segment based at least in part on one or more queries involving one or more data tables that reside in a data cloud platform separate from the CRM database; and
providing information describing at least the one or more individuals that are (i) associated with a given account in the list of accounts and (ii) included in the at least one segment for presentation in a graphical user interface (GUI).

12. The computer system of claim 11, wherein the at least one segment is dynamically generated and maintained by the data cloud platform.

13. The computer system of claim 11, wherein the one or more data tables that reside in the data cloud platform are identified based at least in part on metadata maintained by the CRM database.

14. The computer system of claim 11, wherein the list of accounts that are accessible to the user is determined based on one or more queries to the CRM database.

15. The computer system of claim 11, wherein the at least one segment is identified based on a selection of a corresponding option as provided in the GUI.

16. A non-transitory computer-readable medium storing program code, the program code including instructions that are executable by one or more processors of a computer system to perform:
determining a list of accounts that are accessible to a user of a customer relationship management (CRM) database;
determining at least one segment, wherein the at least one segment represents a group of individuals that satisfy membership criteria associated with the at least one segment;
determining one or more individuals that are (i) associated with a given account in the list of accounts and (ii) included in the at least one segment based at least in part on one or more queries involving one or more data tables that reside in a data cloud platform separate from the CRM database; and
providing information describing at least the one or more individuals that are (i) associated with a given account in the list of accounts and (ii) included in the at least one segment for presentation in a graphical user interface (GUI).

17. The non-transitory computer-readable medium of claim 16, wherein the at least one segment is dynamically generated and maintained by the data cloud platform.

18. The non-transitory computer-readable medium of claim 16, wherein the one or more data tables that reside in the data cloud platform are identified based at least in part on metadata maintained by the CRM database.

19. The non-transitory computer-readable medium of claim 16, wherein the list of accounts that are accessible to the user is determined based on one or more queries to the CRM database.

20. The non-transitory computer-readable medium of claim 16, wherein the at least one segment is identified based on a selection of a corresponding option as provided in the GUI.

* * * * *